(12) United States Patent
Spahlinger et al.

(10) Patent No.: US 9,518,825 B2
(45) Date of Patent: Dec. 13, 2016

(54) SUPPRESSION OF LOCK-IN EFFECT DUE TO A MIOC FREQUENCY RESPONSE IN A FIBER-OPTIC SAGNAC INTERFEROMETER

(71) Applicant: Northrop Grumman LITEF GmbH, Freiburg (DE)

(72) Inventors: Guenter Spahlinger, Stuttgart (DE); Olaf Deppe-Reibold, Emmendingen (DE)

(73) Assignee: Northrop Grumman LITEF GmbH (DE)

( * ) Notice: Subject to any disclaimer, the term of this patent is extended or adjusted under 35 U.S.C. 154(b) by 216 days.

(21) Appl. No.: 13/999,602

(22) Filed: Mar. 12, 2014

(65) Prior Publication Data

US 2014/0268164 A1    Sep. 18, 2014

(30) Foreign Application Priority Data

Mar. 12, 2013  (DE) .................. 10 2013 004 380

(51) Int. Cl.
*G01C 19/72*        (2006.01)
(52) U.S. Cl.
CPC ........... *G01C 19/721* (2013.01); *G01C 19/726* (2013.01)

(58) Field of Classification Search
CPC ...... G01C 19/726; G01C 19/68; G01C 19/721
See application file for complete search history.

(56) References Cited

U.S. PATENT DOCUMENTS

| | | |
|---|---|---|
| 5,018,860 A | 5/1991 | Bielas et al. |
| 5,365,338 A | 11/1994 | Bramson |
| 5,442,442 A | 8/1995 | Kanegsberg et al. |
| 5,504,580 A | 4/1996 | Hollinger et al. |
| 5,883,716 A | 3/1999 | Mark et al. |
| 5,999,304 A | 12/1999 | Sanders et al. |
| 6,445,445 B1 | 9/2002 | Nakayama et al. |
| 7,190,463 B2 * | 3/2007 | Spahlinger ........... G01C 19/726 356/460 |
| 2007/0103691 A1 | 5/2007 | Greening et al. |
| 2009/0201510 A1 | 8/2009 | Ward et al. |
| 2013/0044328 A1 | 2/2013 | Sanders et al. |

* cited by examiner

*Primary Examiner* — Hwa Lee
(74) *Attorney, Agent, or Firm* — Tarolli, Sundheim, Covell & Tummino LLP

(57) ABSTRACT

A fiber-optic Sagnac interferometer in a rotation rate sensor comprises a multifunctional integrated optical chip (MIOC) with a MIOC transfer function. A digital filter is connected upstream to the multi-functional integrated optical chip, whose filter transfer function corresponds basically to the inverse MIOC transfer function such that the MIOC transfer function is compensated by the filter transfer function. Corresponding coefficients of the filter transfer function may be determined in a main control loop.

6 Claims, 4 Drawing Sheets

SUPPRESSION OF LOCK-IN EFFECT DUE TO A MIOC FREQUENCY RESPONSE IN A FIBER-OPTIC SAGNAC INTERFEROMETER

BACKGROUND

Field of the Invention

The invention concerns a rotation rate sensor with a fiber-optic Sagnac interferometer as well as a method for controlling a rotation rate sensor with a fiber-optic Sagnac interferometer.

Description of the Prior Art

Fiber-optic Sagnac interferometers are used in rotation rate sensors in inertial navigation systems. Inertial navigation systems can be realized in various manners. Typically positioning is based on measuring forces or accelerations acting on an object and on applied rotation rates. Optical effects may be used instead of mechanical effects for determining rotation rotates for inertial navigation systems. Such an internal navigation system may be based on at least one fiber-optic Sagnac interferometer. This uses the Sagnac effect according to which an optical path difference occurs between two light beams running in opposite directions inside the light guide loop during a rotation about its normal. During observation and superposition of the two light beams exiting the light guide loop a change in intensity becomes visible, which can be described by an interferometer characteristic. This describes the intensity change in dependence of the phase difference between the two light waves. Differently stated, a rotational movement acting on the Sagnac interferometer results in a phase shift between the two light beams circulating opposite to each other such that, at the position where the beams are superposed, a change in intensity can be observed depending on the rotational movement.

The phase shift in a fiber-optic Sagnac interferometer is directly proportional to rotation speed, path length of light in the light guide loop or a light guide coil and the diameter of the circular light path. The phase shift is inversely proportional to the wave length of the light.

The above-described interferometer characteristic, which describes the dependency of light intensity and which is observable for determining the rotation from the phase difference, is cosine-shaped.

As a transfer function is insensitive to small input values in the maximum of the cosine curve and the sign of the phase shift corresponding to the rotation direction is not detectable, the working point of the Sagnac interferometer is often adjusted to the point of a maximum gradient of the cosin function. Sine- or square-wave modulation may be considered for this. Maximal sensitivity of the interferometer should be guaranteed at a small rotational movement.

A rotation rate sensor, which comprises a fiber-optic Sagnac interferometer, usually comprises a multi-functional integrated optical chip (MIOC) for carrying out a phase modulation. The MIOC is typically part of a control loop for adjusting the phase modulation described above. Physical effects in the MIOC, e.g. movable charge carriers, cause a frequency dependence of phase modulation. The MIOC therefore has a frequency response as different frequency responses occur for different frequencies. As this phenomenon can also be traced to the mobility of charge carriers in the MIOC, there is also a dependency of the MIOC frequency response on the surrounding temperature or the temperature of the MIOC itself.

This MIOC frequency response leads to a special form of the lock-in effect, which manifests itself such that, at a small rotational rate of about 0°/h an accumulation of output signals occurs that corresponds to a rotation rate of 0°/h. The insensitivity of the Sagnac interferometer with respect to very small rotation rates resulting therefrom constrains a highly precise and reliable measurement of, in particular, very small rotation rates under non-constant temperature conditions.

SUMMARY AND OBJECTS OF THE INVENTION

The invention is based on the problem of providing a rotation rate sensor with a fiber-optic Sagnac interferometer for which the lock-in effect caused by the MIOC frequency response is effectively reduced and, for which, also at very small rotation rates and non-constant temperature conditions, highly precise rotation rate measurements can be carried out.

A fiber-optic Sagnac interferometer of the present invention in a rotation rate sensor comprises a light source, a polarizer, a fiber coil, a photo detector device, an amplifier with a downstream connected analog/digital converter, a digital/analog converter, an evaluation circuit, an adder and a phase modulator. Synonymous to the fiber-optic Sagnac interferometer is, for example, a fiber-optic ring interferometer structure. Here, the light source is advantageously capable of emitting light of adjustable wavelength. As indicated above and as will be detailed in what follows, small phase shifts have to be detected. Typically a so-called super-luminescence diode (SLD) is used as a light source, since it has a broader optical bandwidth than a laser light source and, hence, a shorter coherence length. The advantage of a shorter coherence length (typically 25 µm) is the incoherence between the signal and further light signals generated e.g. at reflection or scattering points.

The polarizer is configured to polarize the light of the light source. The fiber coil corresponds to one of the aforementioned light guide coils and is formed basically from an optical fiber wound into a coil. The optical fiber may, for example, be a micro-structured fiber or a combination of micro-structured fibers such that the optical fiber is formed completely or only partly from a light guiding material. The photo detector device is configured to convert impinging light into electrical signals, which comprise, at first, information about light intensity from which information about the wavelength, interference or an interference signal, or a phase shift may be deduced if necessary. The phase modulator is e.g., arranged in the MIOC, i.e. before the fiber coil, and configured to modulate the phase of a light beam.

Two light beams from the light source, polarized by the polarizer and generated by a beam splitter, are injectable into the fiber coil in directions opposite to one another and are subsequently recombinable. Arrangements using mirrors or semi-mirrors may be used in this process so that a beam emitted from the light source becomes separated and, hence, two light beams from the light source are present, which are in turn injected into the fiber coil in opposite directions. Typically the whole assembly and, in particular, the beam splitting and recombination as well as the phase modulation are realized with integrated optical components. The two light beams coming from the light source can be modulated by means of the phase modulator arranged in the fiber coil. By using the phase modulator, the phase of one light beam or both light beams may therefore be changed, which corresponds to a phase shift of the two light beams with respect to one another.

The photo detector device is exposable to the interference signal generated by the recombination of light beams and, hence, a signal corresponding to the intensity of the interference signal is deliverable by the photo detector device. This signal may be fed to the amplifier with the downstream connected analog/digital converter. The output signals of the analog/digital converter are processable in the evaluation circuit.

A digital phase reset signal is producible and deliverable to the digital/analog converter by a main control loop of the evaluation circuit for producing a reset signal which is to be fed to the phase modulator. The control loop has a multi-functional integrated optical chip (MIOC) with a transfer function particular to it ("MIOC transfer function"). Such a multi-functional integrated optical chip has been described, and also its functions, for controlling the phase modulation. A MIOC is mostly provided as a self-contained element which has one optical input and two optical outputs. Splitting of a light beam and recombination of the produced beams is therefore provided within the MIOC.

Phase modulation may be effected on at least one of the two partial beams, for example, by means of electrodes. In this process the effective index or the capability for guiding the light may be influenced by an electric field applied by means of the electrodes. Hence, the phase modulator is virtually a constituent of the MIOC or, stated differently, is realized by the MIOC. The MIOC therefore represents an essential constituent of a fiber gyroscope and, hence, of the fiber-optic Sagnac interferometer. In this process, free charge carriers influence the transfer function of the MIOC so that high pass behavior occurs and, hence, at higher modulation frequencies a larger phase deviation is generated. This behavior leads, as mentioned above, to a special form of the lock-in effect.

As described, a phase shift of the two light beams with respect to one another may be generated in the fiber coil by the phase modulator of the MIOC. It is typically desired for the phase modulator to adjust the phase shift of the two light beams so that the working point always lies at half of the maximum intensity on the cosine-shaped interferometer characteristic and, hence, at a point of a maximum gradient of this characteristic. In order to always adjust a corresponding phase shift for rotation of the interferometer, the reset signal is generated that is to be fed to the phase modulator. This reset signal also indicates the degree of a rotational movement and is in turn generated on the basis of the signal of the photo detector unit that is fed to the amplifier with the downstream connected analog/digital converter.

For a better understanding, the above-described technology will be explained again in what follows in a different manner. All light beams or light signals within the fiber coil exist in an analog domain. A manipulation of, for example, the modulation signals and signals of the photo detector device (or even the main control loop) is performed in the evaluation circuit in a digital domain. In order to acquire the reset signals essential for phase modulation, a modulation signal is generated in the evaluation circuit. This modulation signal controls, after a conversion by the digital/analog converter, the phase modulator as the reset signal and, hence,—expressed simplified—"the gyro". Also, expressed simplified, the reset signal passes as output of the digital/analog converter in analog form through the analog domain of the interferometer arrangement or the gyro path and then arrives as a signal proportional to the received light intensity of the combination of the two light beams at the input of a demodulator.

In a fiber-optic Sagnac interferometer of the present invention in a rotation rate sensor a digital filter is connected upstream of the multi-functional integrated optical chip, whose filter transfer function basically corresponds to the inverse of the MIOC transfer function so that the MIOC transfer function can be compensated by the filter transfer function. The characteristic MIOC transfer function, in which the aforementioned frequency or temperature dependency is included, may be, for example, measured to this end or determined by using simulations or empirical values or calculated in case of knowledge of the MIOC transfer function. Hence, in all cases a basically inverse MIOC transfer function is available as filter transfer function of the digital filter. As small deviations or imprecisions may always arise in simulations or measurements it is referred to an in any case basically inverse MIOC transfer function here. In the ideal case, however, a really inverse MIOC transfer function should be calculated as filter transfer function. It is the MIOC transfer function, for example, determined by $H^*(z)$, where T represents the sampling time and $$z = e^{j\omega T}$$

holds, the filter transfer function is $$H(z) = 1/H^*(z).$$

Here, the relation of the angular frequency in the z transform is established by r0.

The frequency response of the MIOC influences the analog domain since it concerns analog modulation of the fiber gyroscope. The digital filter connected upstream of the MIOC id—as already indicated by its name—arranged before the digital/analog converter and acts primarily on the digital domain. The signal processing in the digital domain is influenced by the digital filter as the filter transfer function inverse to the MIOC transfer function is integrated here. The inverse mapping of the MIOC transfer function in the analog domain is therefore integrated into the signal processing by the digital filter in the digital domain. More precisely, the reset signal and modulation signal which is to be fed to the phase modulator is generated on basis of the output of the digital filter. This compensates the frequency or temperature dependence of the MIOC which are respectively reflected in the MIOC transfer function.

The filter transfer function is in practice usually describable by coefficients that define a corresponding frequency response to an input signal or output function. A fiber-optic Sagnac interferometer according to another embodiment comprises an adjustment unit for adjusting coefficients of the filter transfer function as well as a coefficient calculation unit for providing the coefficients to the adjustment unit. The mere transfer function may, for example, be described by a function $H^*(z, a_0, a_1)$ and comprise coefficients $a_0$ and $a_1$, where it holds that $$z = e^{j\omega T}$$

Accordingly results the inverse filter transfer function results therefrom $$H(z, a_0, a_1) = 1/H^*(z, a_0, a_1),$$

where it holds that:

$$H(z, a_0, a_1) \cdot H^*(z, a_0, a_1) = 1.$$

In practice $H^*(z)$ may be described in good approximation, for example, as follows:

$$H^*(z) = \frac{(1+a_1z^{-1})}{(1+a_0z^{-1})};$$

such that the following holds:

$$H(z) = [H^*(z)]^{-1} = \frac{(1+a_0z^{-1})}{(1+a_1z^{-1})}.$$

According to a further embodiment, the coefficients are calculable by the coefficient calculation unit on the basis of output signals of the multi-functional integrated optical chip. Output signals of the MIOC, whose frequency or temperature behavior is to be compensated are therefore usable for determining corresponding coefficients of the filter transfer function. The coefficient calculation unit calculates coefficients based on the output signals of the MIOC and provides them to the adjustment unit. In this case, an adaptive digital filter is involved.

In a fiber-optic Sagnac interferometer according to another embodiment, the coefficients of the filter transfer function are available to the coefficient calculation unit as predetermined values. The corresponding predetermined values may, for example, be based on simulations or empirical values or measurement values determined previously to operation of the Sagnac interferometer by the MIOC, (e.g. based on output signals of the MIOC) which are stored in the coefficient calculation unit. An adaptation of the predetermined coefficients during operation of the fiber-optic Sagnac interferometer according to one of the described possibilities may additionally be provided.

According to another embodiment of a fiber-optic Sagnac interferometer, the coefficients of the filter transfer function are determined by means of the coefficient calculation unit on the basis of the demodulated signal which serves as an input of the main controller and from which the main controller calculates the reset signal. In the reset signal the MIOC frequency response and the MIOC coefficients, respectively, are naturally reflected. The MIOC coefficients thus reflected in the demodulated signal accordingly may be regained and used for determining the filter coefficients of the digital filter.

According to a further embodiment of a fiber-optic Sagnac interferometer, a first and a second phase modulation signal are producible by means of the coefficient calculation unit. The first phase modulation signal is producible from the phase reset signal, wherein the digital filter and the MIOC do not have an impact on the phase reset signal. The second phase modulation signal is also producible from the phase reset signal, wherein the digital filter and the MIOC have an impact on the phase reset signal. Moreover, a phase modulation error signal is calculable by means of the coefficient calculation unit as a difference between the first and the second phase modulation signal. The coefficients of the filter transfer function are eventually calculable based on the phase modulation signal (also by the coefficient calculation unit).

In a method of the present invention for controlling a fiber-optic Sagnac interferometer in a rotation rate sensor, the Sagnac interferometer comprises a light source, a polarizer, a fiber coil, a photo detector device, an amplifier with a downstream connected analog/digital converter, a digital/analog converter, a phase modulator, and an evaluation circuit. These components have already been described above and correspond to the above description.

Two light beams coming from the light source and polarized by the polarizer and generated by beam splitting are injected into the fiber coil in directions opposite to one another and are subsequently recombined. The photo detector unit is exposed to the interference signal generated by the recombination of the light beams after the passage through the polarizer, wherein a signal corresponding to the light intensity of the interference signal is delivered by the photo detector unit that is fed to the amplifier with the downstream connected analog/digital converter, whose output signals are processed in the evaluation circuit. A digital phase reset signal is generated by a main control loop of the evaluation circuit and supplied to the digital/analog converter for production of a reset signal is generated and supplied to the digital/analog converter for production of a reset signal fed to the phase modulator wherein the control loop comprises a multi-functional integrated optical chip (MIOC) with an MIOC transfer function. This has already been detailed more precisely above.

According to the method, a digital filter is connected upstream to the multi-functional integrated optical chip (MIOC) wherein the filter transfer function of the digital filter basically corresponds to the inverse MIOC transfer function. Further, the MIOC transfer function is compensated by the filter transfer function.

According to an embodiment of the method, the digital filter and the MIOC are avoided and a first phase modulation signal is generated based on the phase reset signal. Further, the digital filter and the MIOC are again involved and a second phase modulation signal is generated based on the phase reset signal. Then, a phase modulation error signal is calculated as difference between the first and the second phase modulation signal. Coefficients of the filter transfer function of the digital filter are then determined based on the phase modulation error signal and the determined coefficients are set as the coefficients of the filter transfer function. Differently stated, the determined coefficients are set such that they define a filter transfer function reciprocal to the MIOC transfer function.

The preceding and other features of the invention will become further apparent from the detailed description that follows. Such written description is accompanied by a set of drawing figures in which numerals point to the features of the invention with like numerals referring to like features throughout.

DETAILED DESCRIPTION OF THE PREFERRED EMBODIMENT

Figure 1:
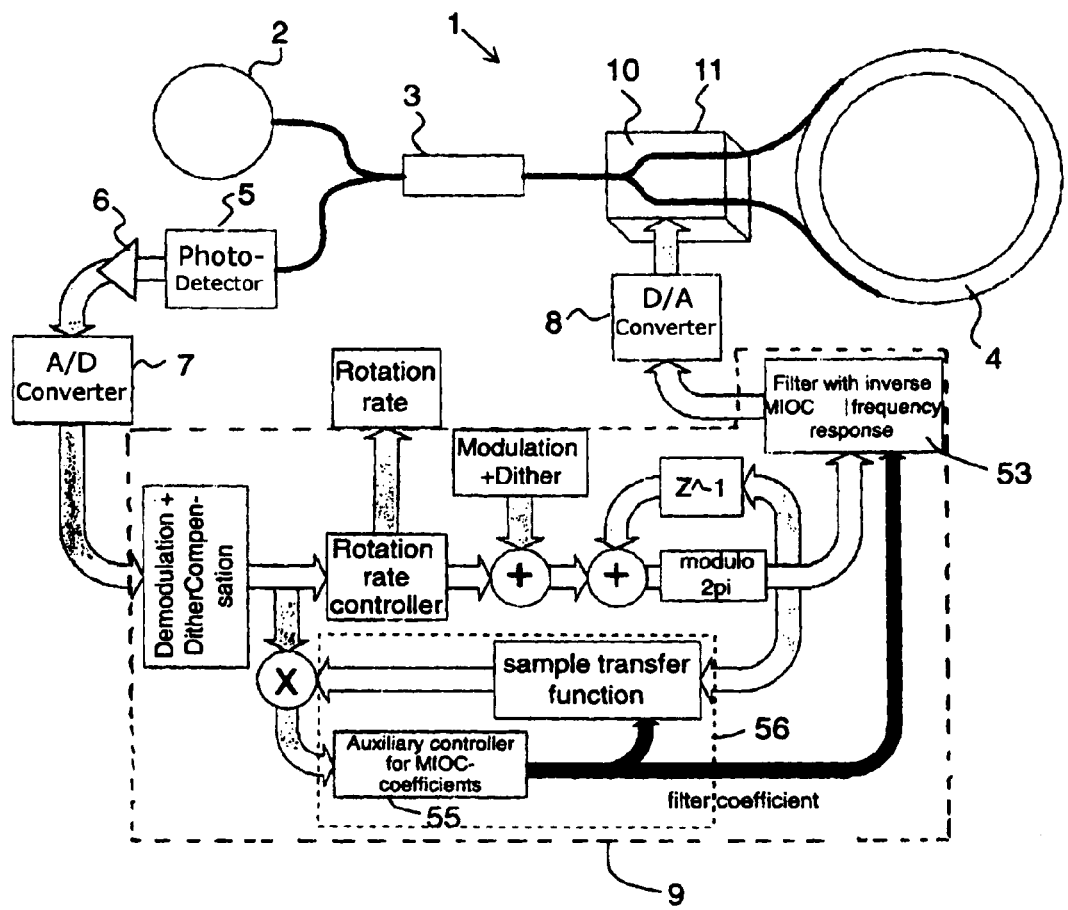
FIG. 1 is a fiber-optic Sagnac interferometer according to an embodiment of the invention in schematic form.

In FIG. 1, a further exemplary fiber-optic Sagnac interferometer 1 according to the invention is illustrated in schematic form that comprises the components already described above. In particular, a light source 2, a polarizer (for example integrated within the multi-functional integrated optical chip 11), a fiber-optical coupler 3, a fiber coil 4, a photo detector device 5, an amplifier 6 with a downstream connected analog/digital converter 7, a digital/analog converter 8, an evaluation circuit 9, and a phase modulator 10 of a multi-functional integrated optic chip (MIOC) 11 with an accordingly upstream connecter filter 53 are provided. This interferometer has an adaptive filter function, wherein by means of an auxiliary controller for MIOC coefficients 55 filter coefficients or their values are transmitted to the filter 53. These coefficients are determined by the control loop illustrated in FIG. 3c in accordance with the above. The auxiliary controller for MIOC coefficients 55 and a sample transfer function may be formed e.g. in processor 56.

The light source 2 is configured to emit light of a given wavelength. The polarizer is configured to polarize the light of the light source. The fiber coil 4 consists basically of an optical fiber would into a coil. The photo detector unit 5 is configured to convert incident light into electrical signals that comprise information, for example, about light intensity, wavelength, interference or an interference pattern, or phase shift.

The phase modulator 10 is configured to modulate the phase of a light beam. The phase of one of the two light beams, or both light beams, may therefore be changed by means of the phase modulator 10, which corresponds to a phase shift of the two light beams with respect to one another.

The photo detector unit 5 is exposible to the interference signal generated by the recombination of the light beams, wherein a signal corresponding to the intensity of the interference signal is deliverable by the photo detector unit 5. This signal is fed to the amplifier 6 with the downstream connected analog/digital converter 7. The output signals of the analog/digital converter Tare processible in the evaluation circuit 9.

A digital phase reset signal is producible and deliverible to the digital/analog converter 8 for production of a reset signal to be fed to the phase modulator 10 by the evaluation circuit 9. The multi-functional integrated chip (MIOC) 11 has a transfer function particular to it (MIOC transfer function). The multi-functional integrated optical chip 11 is represented in FIG. 1 and not illustrated in spatial characteristic or arrangement. The digital filter 53 is connected upstream of the MIOC 11, its filter transfer function being inverse to the MIOC transfer function.

As described above, the frequency response of the actual MIOC 11 influences the analog domain, as it concerns analog modulation in the fiber gyroscope. The digital filter 53 is arranged upstream to the digital/analog converter 8 and acts primarily in the digital domain. The signal processing and the digital domain are influenced by the digital filter 53 as the filter transfer function inverse to the MIOC transfer function is integrated into it.

Further, the fiber-optic Sagnac interferometer 1 comprises the processor 56 that may function as an adjustment unit for adjusting the coefficients of the filter transfer function and function as a coefficient calculation unit for providing the coefficients to the adjustment unit. The coefficients are calculable by means of the coefficient calculation unit of the processor 56 according to the principles described above.

Light beams running through the fiber coil 4 and, thus, the signals passing through the fiber coil 4, are available in the analog domain. In order to carry out adequate signal processing of the desired phase modulation in the fiber coil 4, signal processing is carried out in the digital domain in the evaluation circuit 9.

Accordingly, the light or signal output of the fiber coil 4 is supplied to an analog/digital converter 7 indicated by ADC (analog/digital converter). The fiber coil 4 is itself supplied by the signal output of a digital/analog converter denoted by DAC (digital/analog converter).

Two light beams coming from the light source 2, polarized by the polarizer and generated by beamsplitting, are injectible into the fiber coil in opposite directions and are subsequently recombinable. The two light beams may be modulated by means of a phase modulator (not shown). The phase modulator may e.g. be arranged in the MIOC 11 or the MIOC 11 may carry out a function of the phase modulator. The phase modulator is capable of generating a phase shift with respect to each other between the two light beams in the fiber coil based on a reset signal.

A photo detector unit is exposible to the interference signal generated by recombination of the light beams, wherein a signal corresponding to the light intensity of the interference signal is deliverable by the photo detector device to be fed into an amplifier with downstream connected analog/digital converter 7, whose output signals are processible in the evaluation circuit. A phase reset signal is then producible by means of a main control loop of the evaluation circuit 9 and deliverable to the digital/analog converter 8 for production of a reset signal to be fed to the phase modulator. The Sagnac interferometer 1 comprises a multi-functional integrated optical chip (MIOC), in which phase modulation is performed and which therefore comprises the phase modulator.

As described above, a digital filter 53 is connected upstream of the digital/analog converter 8 that has a filter transfer function inverse (i.e. mathematically reciprocal) to the MIOC transfer function. To this end, the filter transfer function is defined by corresponding filter coefficients. These filter coefficients are, for example, determinable as above-described.

The entire evaluation circuit 9 (including the underlying electronic or sensor system as well as the MIOC) operates in cycles provided by a clock. The analog/digital conversion of analog signals in the analog/digital converter 7, the whole digital signal processing in the evaluation circuit 9, the MIOC 11, and the digital analog conversion of digital signals for achieving the modulation and reset signal in the digital/analog converter 8, for example, are each performed according to such cycles. If the filter coefficients are not predetermined, but may be corrected and adjusted, a correction or adaption of a filter transfer function effective in a specific cycle may be performed on basis of signals of one or several previous cycles. The demodulated signal may, for example, be analyzed or observed over a sufficiently long time period, wherein, for example, filter coefficients define a not yet optimal filter transfer function. This demodulated signal is a function of the deviation of the real filter transfer function from the optimal transfer function. Therefore, in case of an optimal filter transfer function, this demodulated signal would be zero. According to the demodulated signal observed during the mentioned time period, the filter coefficients may be adapted to define the filter transfer function for a future time period, which is then adapted optimal to the MIOC frequency response.

The latter principle has already been detailed above (e.g. with respect to an embodiment according to which a first and a second phase modulation signal are producible by the coefficient calculation unit of the processor 56. The first phase modulation signal is producible from the phase reset signal, wherein the digital filter 53 and the MIOC 11 do not have an impact on the phase reset signal. This corresponds, for example, to switching off or avoiding the digital filter 53. The second phase modulation signal is also producible from the phase reset signal, wherein the digital filter 53 and the MIOC 11 have an impact on the phase reset signal. This corresponds, for example, to switching on or involving the digital filter 53 in a further signal path. A phase modulation error signal is caculable by the coefficient calculation unit of the processor as the difference between the first and the second phase modulation signals of the two signal paths. The coefficients of the filter transfer function are finally calculatible by the coefficient calculation unit of the processor 56 based on the phase modulation error signal and may be effectively used for the following cycles to compensate the MIOC frequency response or its share to a lock-in effect. This will be explained in more detail in what follows.

Figure 2:
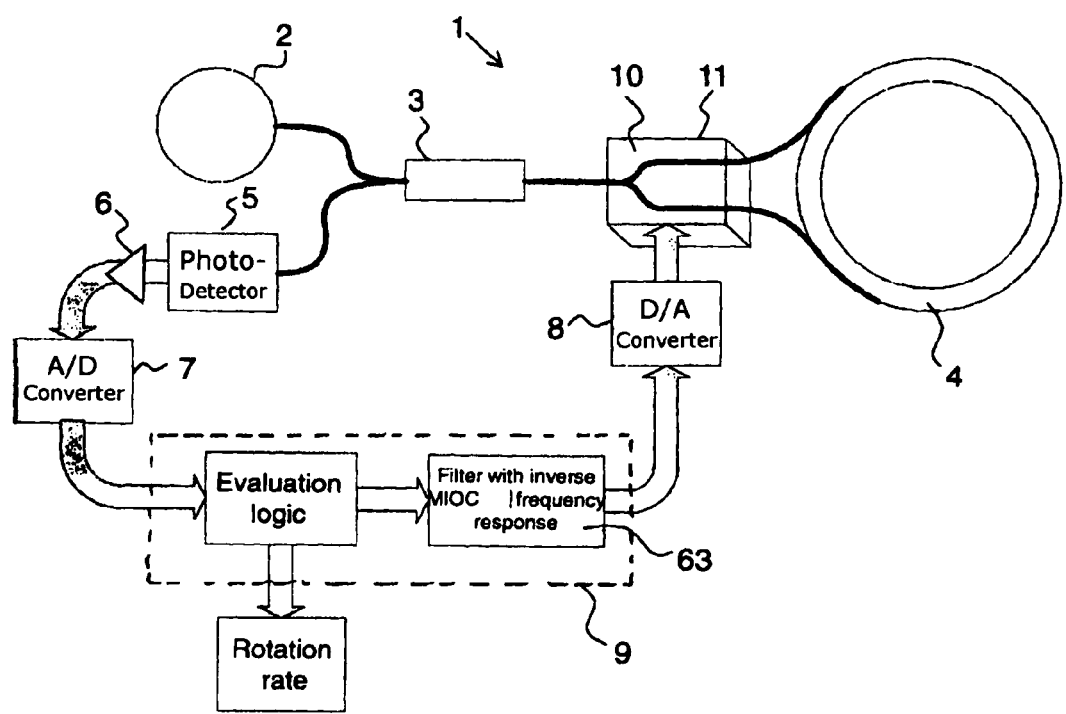
FIG. 2 is a fiber-optic Sagnac interferometer according to another embodiment of the invention in schematic form.

In FIG. 2, an exemplary fiber-optic Sagnac interferometer according to the invention is illustrated in schematic form that matches with the interferometer illustrated in FIG. 1. In particular, the light source 2, the polarizer (for example integrated in the multi-functional integrated optical chip), the fiber-optic coupler 3, the fiber coil 4, the photo detector device 5, the amplifier 6 with the downstream connected analog/digital converter 7, the digital/analog converter 8, the evaluation circuit 9, and the phase modulator 10 of the multi-functional integrated optical chip (MIOC) 11 with the accordingly upstream connected digital filter 63 are illustrated. The digital filter 63 basically corresponds to the digital filter 53 of FIG. 1.

Figure 3A:
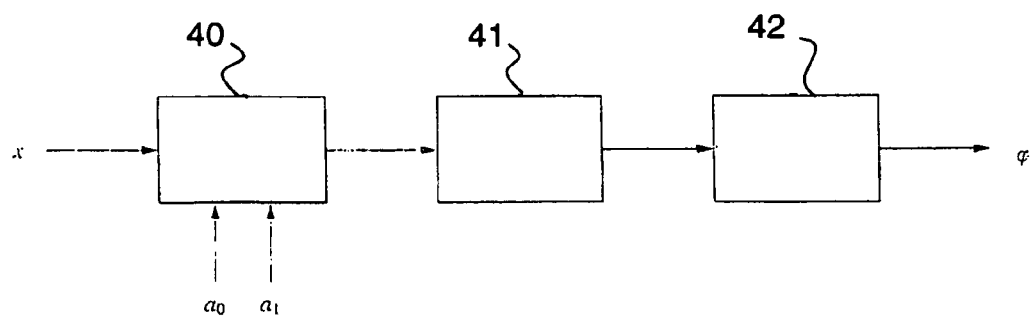
FIGS. 3a to 3c comprise block diagrams for illustrating transfer functions illustrated in schematic form.
Figure 3B:
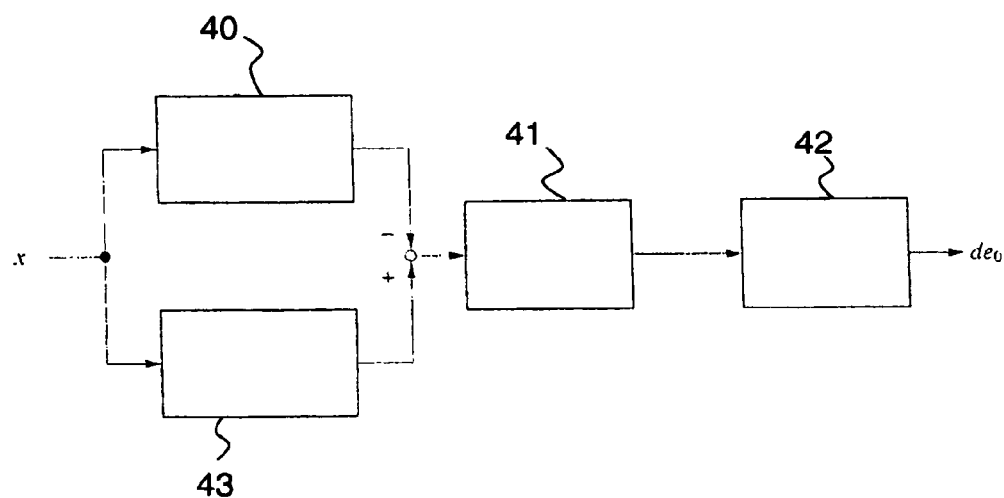
Figure 3C:
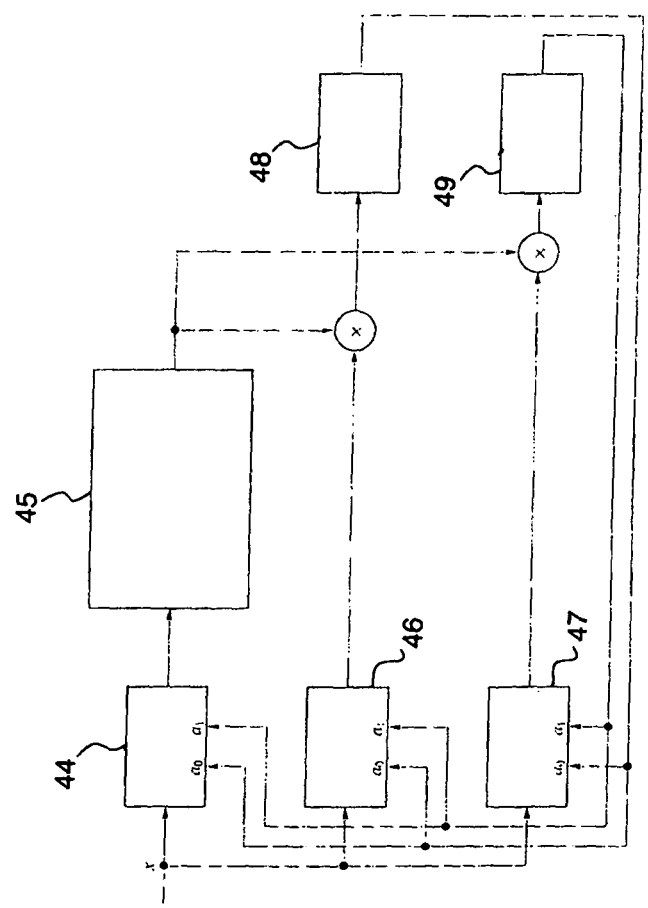

According to FIGS. 3a to 3c it is shown how the filter coefficients of the digital filter 53, 63 may be determined so that the filter transfer function is reciprocal to the MIOC transfer function. First, consider the block diagram of FIG. 3a. As already detailed, the multi-functional integrated optical chip MIOC has, because of its specific material characteristics, in particular because of charge carrier mobility therein, a frequency dependent transfer function, which can be expressed in good approximation as follows:

$$H^*(z) = \frac{1 + a_1 z^{-1}}{1 + a_0 z^{-1}}. \quad \text{(equation 1)}$$

where for a sampling time $Tz = e^{j\omega T}$ holds.

This transfer function leads to an output of sensor errors (i.e. to an output of a deviation) of a measured, or more precisely stated, determined rotation rate with respect to an actual rotation rate. In particular, such sensor errors occur at low rotation rates. The filter module illustrated in FIG. 3a exemplifies the principle of the action of the proposed digital filter which is represented by the block 40. The model of the digital filter 40, which may also be denoted as compensator, comprises one input signal x as well as two coefficients $a_0$ and $a_1$. The digital filter 40 has a filter transfer function $H(z, a_0, a_1)$.

Block 41 represents the MIOC orits action to whose transfer function the filter transfer function of the digital filter 40 is reciprocal. The MIOC transfer function is therefore a function $H^*(z, a_0, a_1)$, which corresponds to $H^{-1}(z, a_0, a_1)$. In the ideal case, the coefficients of the transfer function of the digital filter 40 correspond to those of the MOC transfer function. The signal equalized by the digital filter 40 which passes through the MIOC is fed to the block 42 with $1-z^{-1}$ which calculates a difference and provides the effective phase φ while simulating the Sagnac interferometer.

In order to determine the coefficients $a_0$ and $a_1$ for the digital filter 40 so that $H^*(z, a^*_0, a^*_1)$ and $H(z, a_0, a_1)$ are reciprocal to one another, one may proceed, for example, as follows. The coefficients of $H^*$ are at first usually unknown unless they are not already present because of empirical values or based on simulations. In addition, the coefficients are dependent from the surrounding temperature as well as from time such that the coefficients $a_1$ have to be constantly updated to the current values $a^*_1$. For this reason the digital filter 40 is adaptive and may always apply newly determined coefficients to the filter transfer function.

While considering FIG. 3b and the already shown blocks 40, 41 and 42, the following considerations are to be first comprehended. At the input x of the block diagram acts, besides the reset signal and a dither signal, a permanently active modulation signal for the phase modulation. The "level setting" in the fiber gyroscope resulting therefrom generates, in case of equalization or compensation by means of the optimal adjusted digital filter, a first phase modulation $\phi = \phi_e$. In the non-equalized case (i.e. at a non-optimal adjustment of the digital filter 40), another phase modulation $\phi = \phi_n$ occurs. Hence, in the non-equalized case a phase error with respect to the equalized case occurs, where the resulting phase error amounts to $e = \phi_n - \phi_e$. From this error signal e the coefficients $a_1$ may be exactly determined or may be updated to the ideal value, for example, by the above described coefficient calculation unit.

Possible rules for the adoption of the coefficients may, for example, be based on a calculation of the error signal e for incremental deviations of the coefficients in H(z). Differently stated, the error signal e is calculated for the two non-equalized cases $H(z, a_0 + da_0, a_1)$ in block 43 and analogously for $H(z, a_0, a_1 + da_1)$ (not shown).

The difference between the two transfer functions $H(z, a_0 + da_0, a_1) - H(z, a_0, a_1)$ may be replaced by $$da_0 \cdot \partial H(z, a_0, a_1)/da_0.$$

Together with the equation 1, the resulting partial derivatives are $$\frac{\partial H(z)}{\partial a_0} = \frac{z^{-1}}{1 + a_1 z^{-1}} \text{ or } \frac{\partial H(z)}{\partial a_1} = \frac{-z^{-1}(1 + a_0 z^{-1})}{(1 + a_1 z^{-1})^2}.$$

Resulting sample transfer functions are therefore $$H_0(z) = \frac{\partial H(z)}{\partial a_0} \cdot H^{-1}(z) \cdot (1 - z^{-1}) = \frac{z^{-1}(1 - z^{-1})}{1 + a_0 z^{-1}} bzw.$$

$$H_1(z) = \frac{\partial H(z)}{\partial a_1} \cdot H^{-1}(z) \cdot (1 - z^{-1}) = \frac{-z^{-1}(1 - z^{-1})}{1 + a_1 z^{-1}}.$$

Under consideration of FIG. 3c a possibility will now be explained to determine the coefficients effectively. Block 44 represents the transfer function H(z). Block 45 is a model of the gyro path including the demodulation and the dither compensation. Block 46 represents $H_0(z)$ and block 47 $H_1(z)$, respectively. The sample transfer functions $H_0(z)$ and $H_1(z)$ are now to be supplied with the signal x, which reflects the modulation, the phase reset, and the dithering. From this, the sample functions result which are to be expected as error signal in case of a deviation of the coefficients $a_0$ and $a_1$ from the ideal values. Using this by correlation of the error signal e with these two sample functions the input values for two additional auxiliary control loops 48 and 49 for producing $a_0$ or $a_1$ may be generated. These auxiliary control loops 48 and 49 may also be constituents of the coefficient calculation unit. The error signal itself may, for example, be gained by a fiber gyroscope by measuring the detector signal which is demodulated and freed from the dither signal fed to it. It has been recognized that during this process the error signal e is generated such that it can be obtained in an easy manner. Therefore, the structure of an adaptive equalizer or of a digital filter with filter coefficients adapted to an MIOC frequency response illustrated in FIG. 3c is provided.

While this invention has been described with reference to its presently preferred embodiment, it is not limited thereto. Rather, the invention is limited only insofar as it is defined by the following set of patent claims and includes within its scope all equivalents thereof.

What is claimed is:

1. Rotation rate sensor with a fiber-optic Sagnac interferometer wherein the fiber-optic Sagnac interferometer comprises:
   a light source,
   a polarizer,
   a fiber coil,
   a photo detector device,
   an amplifier with a downstream connected analog/digital converter,
   a digital/analog converter,
   an evaluation circuit, and
   a phase modulator, and wherein two light beams coming from the light source, being polarized by the polarizer and generated by a beam splitting are injectible in the fiber coil in directions opposite to each other and are subsequently recombinable and
   wherein the two light beams can be modulated by the phase modulator arranged in the fiber coil, and
   wherein the photo detector device is exposible to the interference signal generated by the recombination of the light beams,
   wherein a signal corresponding to a light intensity of the interference signal is deliverable by the photo detector device, which is to be fed to the amplifier with the downstream connected analog/digital converter, whose output signals are processible by the evaluation circuit, and
   wherein a main control loop of the evaluation circuit is configured to produce a digital phase reset signal and to deliver the digital phase reset signal to the digital/analog converter for production of a reset signal to be fed to the phase modulator,
   wherein the main control loop comprises a multi-functional integrated optical chip with a MIOC transfer function, characterized in that, a digital filter is connected upstream to the multi-functional integrated optical chip, whose filter transfer function corresponds to the inverse MIOC transfer function such that the MIOC transfer function is compensatible by the filter transfer function, the fiber-optic Sagnac interferometer further comprising:
   an adjustment unit for adjusting of coefficients of the filter transfer function, and
   a coefficient calculation unit for providing the coefficients to the adjustment unit, wherein by the coefficient calculation:
   a first phase modulation signal is producible from the phase reset signal, wherein the digital filter and the multi-functional integrated optical chip have no impact on the phase reset signal,
   a second phase modulation signal is producible from the phase reset signal, wherein the digital filter and the multi-functional integrated optical chip have an impact on the phase reset signal,
   a phase modulation error signal is calculatable as a difference between the first and the second phase modulation signals, and
   the coefficients of the filter transfer function are calculatable based on the phase modulation error signal.

2. Rotation rate sensor according to claim 1, characterized in that the coefficients are calculable by the coefficient calculation unit based on output signals of the multi-functional integrated optical chip.

3. Rotation rate sensor according to claim 1, characterized in that the coefficients of the filter transfer function are present in the coefficient calculation unit as predetermined values.

4. Rotation rate sensor according to claim 1, wherein the coefficient calculation unit is to calculate the coefficients of the filter transfer function based on the MIOC coefficients of the multi-functional integrated optical chip.

5. Rotation rate sensor according to claim 1, wherein the coefficient calculation unit is to calculate the coefficients of the filter transfer function based on a demodulated signal, the demodulated signal to serve as input of the main controller and from which the main controller calculates the reset signal.

6. Method for controlling a rotation rate sensor with a fiber-optic Sagnac interferometer, wherein the fiber-optic Sagnac interferometer comprises:
   a light source,
   a polarizer,
   a fiber coil,
   a photo detector device,
   an amplifier with a downstream connected analog/digital converter,
   a digital/analog converter,
   an evaluation circuit, and
   a phase modulator and wherein two light beams coming from the light source, being polarized by the polarizer and generated by a beam splitting are injected in the fiber coil in directions opposite to each other and are subsequently recombined, and
   wherein the photo detector device is exposed to the interference signal generated by recombining the light beams after its passage through the polarizer,
   wherein a signal corresponding to a light intensity of the interference signal is delivered by the photo detector device, which is fed to the amplifier with the downstream connected analog/digital converter, whose output signals are processed in the evaluation circuit, and
   wherein a main control loop of the evaluation circuit is configured to produce a digital phase reset signal and to deliver the digital phase reset signal to the digital/analog converter for production of a reset signal to be fed to the phase modulator,
   wherein the phase modulator is realized within a multi-functional integrated optical chip with a MIOC transfer function, characterized by the following steps:
   connecting upstream to the multi-functional integrated optical chip a digital filter, wherein the filter transfer function of the digital filter corresponds to the inverse MIOC transfer function,
   compensating the MIOC transfer function by the filter transfer function of the digital filter,
   deactivating or avoiding of the digital filter and the multi-functional integrated optical chip,
   generating a first phase modulation signal based on the phase reset signal,
   activating or involving the digital filter and the multi-functional integrated optical chip, generating a second phase modulation signal based on the phase reset signal, calculating a phase modulation error signal as difference between the first and the second phase modulation signals, determining coefficients of the filter transfer function of the digital filter based on the phase modulation error signal, and adjusting the determined coefficients of the filter transfer function.

* * * * *